United States Patent [19]
Fortin

[11] 3,855,662
[45] Dec. 24, 1974

[54] WIPER DEVICE FOR VEHICLE LIGHTING SYSTEMS

[75] Inventor: Raymond Fortin, Fresnes, France

[73] Assignees: Regie Nationale des Usines Renault, Billancourt; Automobiles Peugeot, Paris, both of France

[22] Filed: Feb. 9, 1973

[21] Appl. No.: 331,109

[30]    Foreign Application Priority Data
         Mar. 28, 1972   France ............................... 72.10911

[52] U.S. Cl.......... 15/250.01, 15/250.02, 15/250.24, 15/250.27, 15/250.29
[51] Int. Cl........... B60s 1/20, B60s 1/44, B60s 1/46
[58] Field of Search......... 15/250.01, 250.04, 250.2, 15/250.24, 250.25, 250.26, 250.27, 250.29

[56]            References Cited
               UNITED STATES PATENTS

| 1,764,868 | 6/1930 | Gray | 15/250.26 X |
| 2,063,055 | 12/1936 | Shaw | 15/250.24 X |
| 3,618,156 | 11/1971 | Riggs | 15/250.29 |
| 3,626,543 | 12/1971 | Schaper | 15/250.21 |
| 3,667,081 | 6/1972 | Burger | 15/250.24 |
| 3,667,082 | 6/1972 | Hoyler | 15/250.02 |
| 3,775,803 | 12/1973 | Brumm et al. | 15/250.29 |

FOREIGN PATENTS OR APPLICATIONS

| 915,421 | 7/1954 | Germany | 15/250.01 |
| 548,089 | 9/1956 | Italy | 15/250.02 |

*Primary Examiner*—Peter Feldman
*Attorney, Agent, or Firm*—Clelle W. Upchurch

[57]            ABSTRACT

A wiper device for reciprocating wiper blades over the screens of vehicle headlamps comprises fixed guides extending between the lamps and slidably carrying two carriages which respectively support rods carrying the wiper blades. A single driving motor drives a crank which angularly reciprocates a rod pivoted to the centre point of the guides, between the two carriages. The ends of this pivoted rod are themselves pivotably connected by respective links to the two carriages, and the links convert the angular reciprocation of the pivoted rod into sliding movement of the carriages. Each lamp has a washer jet which is fed by a pump operated automatically by the movement of one of the carriages.

7 Claims, 5 Drawing Figures

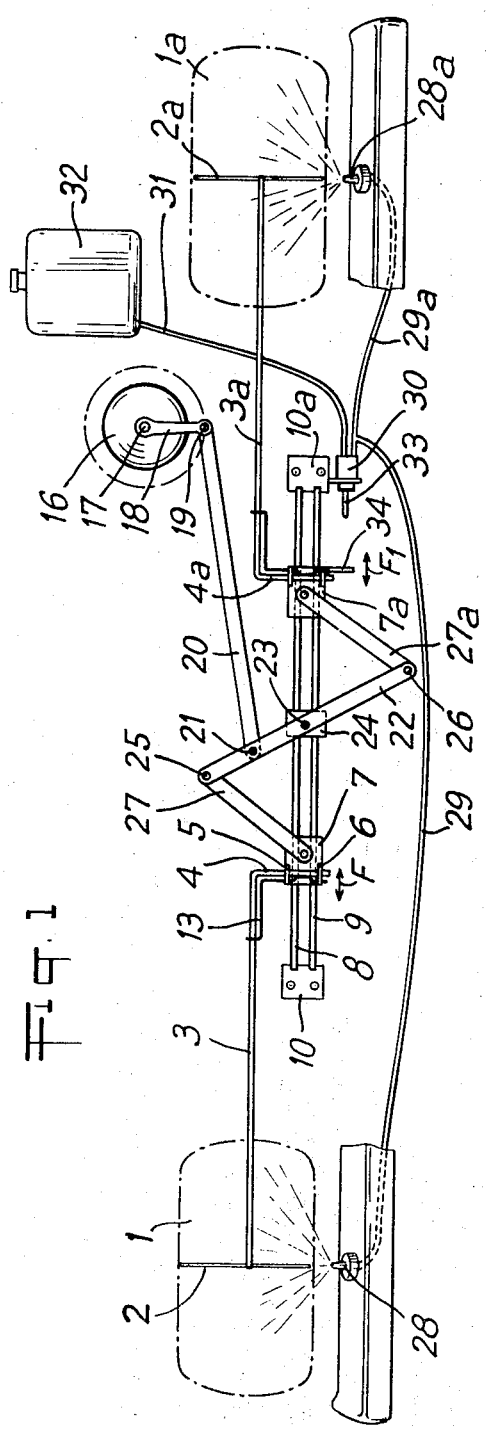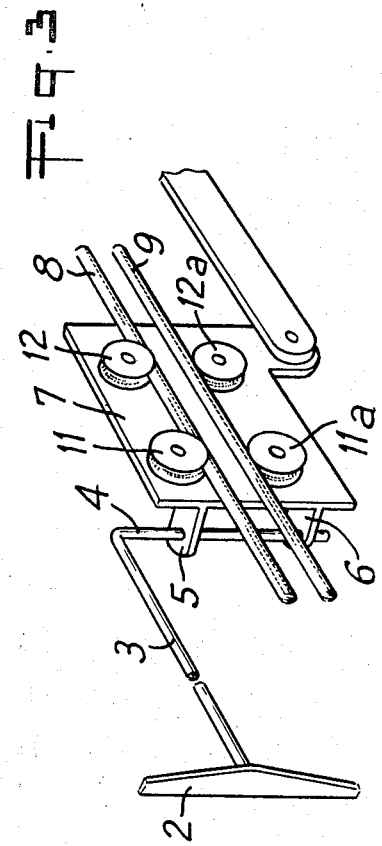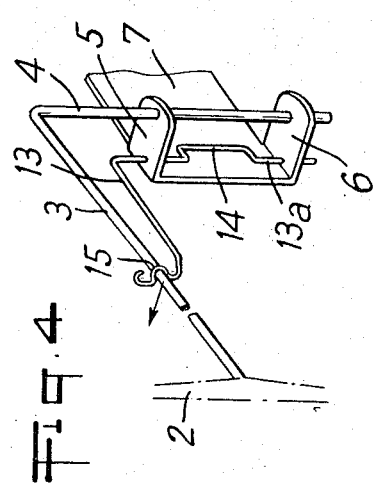

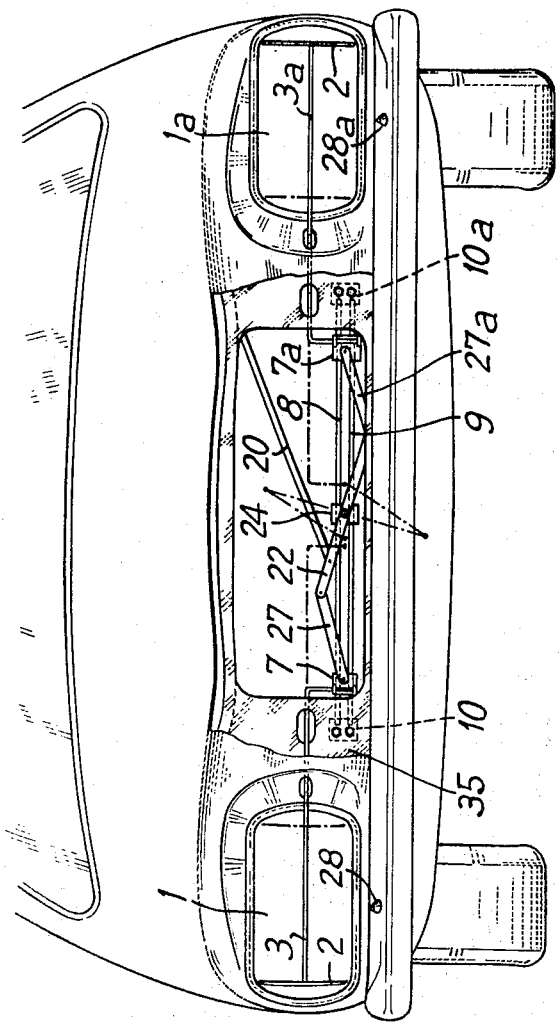
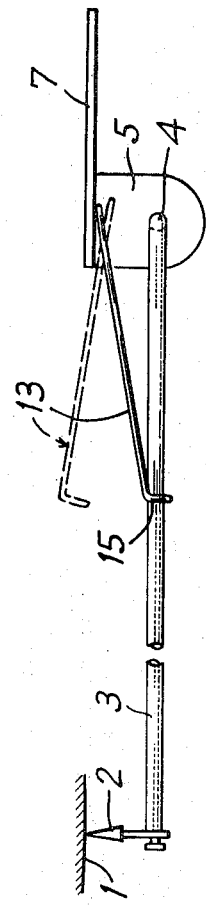

WIPER DEVICE FOR VEHICLE LIGHTING SYSTEMS

BACKGROUND OF THE INVENTION

The present invention relates to a wiper device for vehicle lighting systems, in particular for the headlamps of motor vehicles.

It is known to employ wiper devices for the headlamps of motor vehicles, in which a motor is provided for each headlamp, the motor operating in alternating movement in most cases.

This arrangement is relatively expensive and an object of the invention is to provide an improved wiper device for vehicle lighting systems. More particularly, an object of the invention is to provide a wiper device for a vehicle lighting system, using a single motor, the motor operating in continuous rotary movement.

BRIEF SUMMARY OF THE INVENTION

According to the invention, there is employed a wiper device for motor vehicle lighting systems, in which, at least, two wiper blades operate in alternating movement over the screens of at least two lighting elements, the two rods, each carrying a wiper blade, being respectively fast with two carriages mounted slidably on a guide element attached to a member integral with the vehicle frame, said carriages being connected by a rod linkage to a shaft driven in rotation by a driving element.

The invention makes it easier to mask the moving elements of the arrangement, which is located between the radiator and the radiator grille of the vehicle.

Moreover, an arrangement of this kind can be easily adapted to an existing radiator grille, since it will be sufficient to drill two holes to allow passage for the rods carrying the blades. This very economical arrangement thus makes it possible to avoid any modification of the shape of the radiator grille, and particularly makes it possible to avoid a very expensive alteration of the machine tool used to press this element.

DESCRIPTION OF THE DRAWINGS

Wiper devices embodying the invention for vehicle lighting systems will now be described, by way of example only and with reference to the accompanying drawings, wherein:

FIG. 1 is a front elevation of the wiper device;

FIG. 2 is a front view of a vehicle with the wiper device of FIG. 1 mounted thereon;

FIG. 3 is a perspective view of a modified form of part of the device of FIG. 1;

FIG. 4 is a perspective view of an elastic support member of a blade;

FIG. 5 is a plan view showing the elastic member of FIG. 4.

DESCRIPTION OF PREFERRED EMBODIMENTS

FIGS. 1 and 2 show two screens 1, 1a of the headlamps of a motor vehicle, which are swept respectively by blades 2, 2a in an alternating movement, said blades being attached to one of the ends of rods 3, 3a. On their other ends, the rods 3, 3a have an angled portion 4, 4a (FIGS. 1, 4, 5) mounted pivotably in the arms 5, 6, 5a, 6a of brackets fast with the carriages 7, 7a which are slidably mounted on guide members constituted by bars or sliders 8 and 9, in turn integral at their extremities with plates 10, 10a, for attachment on the frontal portion of the frame or body of the vehicle between the radiator and the radiator grille.

The carriages 7, 7a mounted on the guide bars 8 and 9 are made of a sound-insulating synthetic plastic material, such as polyvinyl chloride or Zytel.

In another form of embodiment, illustrated in FIG. 3, the carriages 7, 7a each comprise two pairs of grooved rollers or pulleys 11, 11a and 12, 12a which are rotatably mounted on said carriages and move on the guide bars 8 and 9. In this manner, friction can be reduced and it becomes possible to use a less powerful and therefore less expensive drive motor.

In order to ensure that the blades 2, 2a apply against the screens 1, 1a of the headlamps, there are employed elastic members 13 (FIGS. 4 and 5), constituted by an angled steel wire which, at one of its ends, engages in the arms 5, 6 of each of the brackets fast with the carriages 7, 7a, said extremity 13a having a loop 14 bearing against the surface of the carriage 7, 7a.

At its other end, the elastic member 13 has a loop 15, into which the rod 3, 3a is engaged.

To ensure that the blade 2 bears against the screen 1 with a certain pressure, the elastic member 13, which is shown at rest in broken lines in FIG. 5, is moved angularly relative to the loop 14 to assume the operating position illustrated in full lines, in which it exerts a certain pressure on rod 3.

The carriages 7, 7a are actuated by a motor 16, the rotary shaft 17 of which carries a crank pin 18, on which, at 19, there is articulated one of the ends of a main rod 20, the other end of which is articulated at 21 on a secondary rod 22 mounted pivotably on an axle 23 attached in its central portion to a plate 24 fast with the guide bars 8 and 9. The secondary rod 22 is connected at its extremities in 25, 26 to the carriages 7, 7a by the return rods 27, 27a.

The rotary motion of the motor shaft 17 is thus converted in an alternating (reciprocating) movement, which is transmitted by the main rod 20 to the secondary rod 22 and to the return rods 27, 27a fast with the carriages 7, 7a which move in the direction indicated by the double arrows F, $F_1$ in a reciprocating movement communicated to the blades 2, 2a.

The secondary rod 22 can assume any intermediate position between an extreme position indicated in full lines in FIG. 2 and another extreme position indicated in dotted lines, said positions corresponding to the extreme positions of the blades 2, 2a, which, in this manner, provide for a substantially complete sweep of the headlamp screens 1, 1a.

The wiper device according to the invention is completed by a screen-washer unit, comprising two jets 28, 28a spraying a cleaning fluid and arranged opposite the screens 1, 1a. The jets 28, 28a are connected by conduits 29, 29a to a pump 30 attached to the plates 10a carrying the bars 8 and 9, said pump being in turn connected by a conduit 31 to a tank 32 containing the cleaning fluid.

The pump 30 comprises an actuator rod 33, which is adapted to meet with a slider 34 fast with one of the carriages 7a, so that during the movement of carriage 7a, the slider 34 actuates the rod 33 controlling the pump, which conveys a certain quantity of cleaning liquid from the tank 32 to the jets 28, 28a, thus directing a spray of liquid on the headlamp screens 1, 1a.

It will be obvious that the devices and methods described in the foregoing solely by way of non-limiting examples can be modified in various ways by those skilled in the art, without exceeding the scope of the invention.

What is claimed is:

1. An apparatus for wiping the screens of lighting elements on a vehicle comprising
    a guide means adapted to be fixed to the vehicle,
    two carriage means movable over the said guide means,
    a wiper blade rod secured to each carriage means,
    a wiper blade attached to each wiper blade rod disposed for reciprocating wiping movement over one of said screens as the carriage means moves to and fro on the guide means,
    a drive means connected to the carriage means for moving it on the guide means comprising a rotatably driven shaft and linkage means comprising a crank attached to the shaft and having a crank pin, a secondary rod pivotally mounted on the guide means between the two carriage means, a main rod connected to the secondary rod and to the crank pin to angularly reciprocate the secondary rod about its pivot point as the shaft rotates, and a pair of rods pivotally connecting the secondary rod with the said carriage means, and means for rotating the shaft.

2. A wiper device according to claim 1, in which each carriage is made of synthetic plastics material.

3. A wiper device according to claim 1, in which the guide means comprises two aligned guide members attached to the vehicle body at their ends, and in which the said carriage means comprises two carriages each carrying respective pairs of rotatably mounted rollers which rotatably engage the guide members.

4. A wiper device according to claim 1, including mounting means attaching one end of each wiper blade rod to a carriage means to permit the other ends of the wiper blade rods to pivot towards and away from the said screens, and including biasing means engaging the wiper blade rods and urging them towards the screens.

5. A wiper device according to claim 4, in which the said mounting means comprises a perpendicularly angled portion attached to the said end of each wiper blade rod and including means on the said carriage means for receiving the angled portions to allow the other ends of the wiper blade rods to pivot towards and away from the said screens.

6. A wiper device according to claim 5, in which the biasing means includes two angled spring rods one end of each of which is anchored to the carriage means and the other end of each of which bears against one of the wiper blade rods.

7. A wiper device according to claim 1, including
    a liquid spray jet mounted on the said body adjacent the front surface of each said screen,
    a cleaning liquid tank mounted on the said body,
    a pump mounted on the said body,
    pipe means connecting the pump to the spray jets and the tank to spray liquid onto the said screens when the pump is actuated,
    a pump actuating member on the pump, and
    a member on a carriage means and positioned to operate the pump actuating member as the carriage means reciprocates.

* * * * *